US011796565B2

(12) United States Patent
Fonoberov et al.

(10) Patent No.: US 11,796,565 B2
(45) Date of Patent: Oct. 24, 2023

(54) AFM IMAGING WITH METROLOGY-PRESERVING REAL TIME DENOISING

(71) Applicant: Bruker Nano, Inc., Santa Barbara, CA (US)

(72) Inventors: Vladimir Fonoberov, Lompoc, CA (US); James Young, Santa Barbara, CA (US); Jason Osborne, Lompoc, CA (US); Sean Hand, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 376 days.

(21) Appl. No.: 17/226,970

(22) Filed: Apr. 9, 2021

(65) Prior Publication Data

US 2022/0326277 A1  Oct. 13, 2022

(51) Int. Cl.
*G01Q 30/06* (2010.01)
*G01Q 60/24* (2010.01)
*G06T 5/50* (2006.01)
*G06T 5/20* (2006.01)
*G06T 5/00* (2006.01)

(52) U.S. Cl.
CPC ............. *G01Q 30/06* (2013.01); *G01Q 60/24* (2013.01); *G06T 5/002* (2013.01); *G06T 5/20* (2013.01); *G06T 5/50* (2013.01); *G06T 2207/10056* (2013.01)

(58) Field of Classification Search
CPC ........ G01Q 30/06; G01Q 60/24; G06T 5/002; G06T 5/20; G06T 5/50; G06T 2207/10056
See application file for complete search history.

(56) References Cited

U.S. PATENT DOCUMENTS

| | | | |
|---|---|---|---|
| 5,898,106 | A | 4/1999 | Babcock et al. |
| 8,296,860 | B2 | 10/2012 | Liu et al. |
| 2007/0251306 | A1 | 11/2007 | Zhou et al. |
| 2009/0032706 | A1 | 2/2009 | Prater et al. |
| 2009/0112957 | A1* | 4/2009 | Abramovitch ......... G01Q 30/04 708/313 |
| 2013/0081159 | A1 | 3/2013 | Liu et al. |
| 2018/0052186 | A1 | 2/2018 | Nano et al. |
| 2020/0043186 | A1* | 2/2020 | Selviah ..................... G06T 7/33 |
| 2021/0066027 | A1 | 3/2021 | Mack |

FOREIGN PATENT DOCUMENTS

KR  10-2018-0043410  4/2018
KR  10-2018-0128065  11/2018

* cited by examiner

*Primary Examiner* — Nicole M Ippolito
(74) *Attorney, Agent, or Firm* — Boyle Fredrickson S.C.

(57) ABSTRACT

A method of operating an atomic force microscope (AFM), using a denoising algorithm, real-time, during AFM data acquisition. Total Variation and Non-Local Means denoising are preferred. Real time images with minimized sensor noise needing no post-image acquisition processing to account for noise as described herein results.

15 Claims, 6 Drawing Sheets

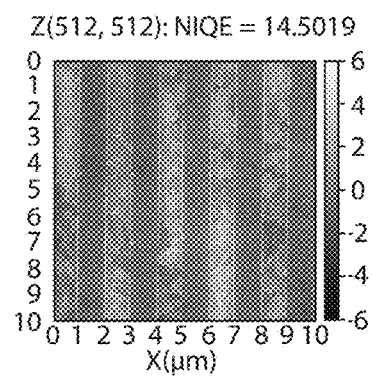 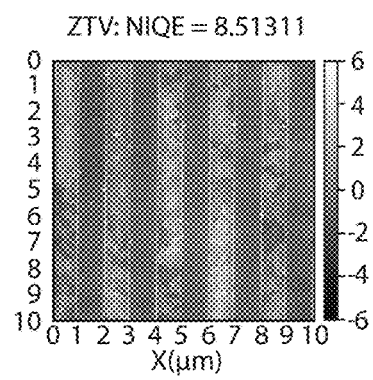 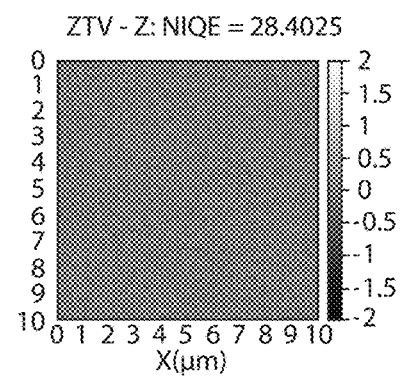
Fig. 5A    Fig. 5B    Fig. 5C
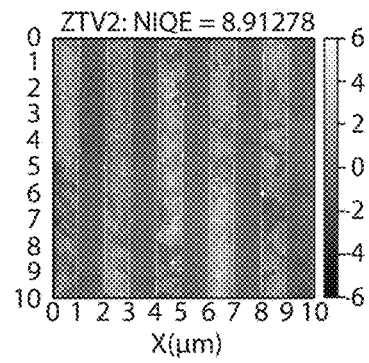 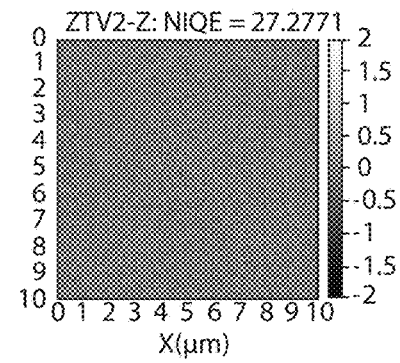
Fig. 5D    Fig. 5E

AFM IMAGING WITH METROLOGY-PRESERVING REAL TIME DENOISING

BACKGROUND OF THE INVENTION

Field of the Invention

The preferred embodiments are directed to Atomic Force Microscopy (AFM), and in particular, a real time method for removing AFM sensor noise while preserving the AFM metrology data.

Description of Related Art

Scanning probe microscopes such as atomic force microscopes (AFMs) are devices which employ a probe having a tip, and causing the tip to interact with the surface of a sample with appropriate forces to characterize the surface down to atomic dimensions. Generally, the probe is introduced to a surface of a sample and by providing relative scanning movement between the tip and the sample, surface characteristic data can be acquired over a particular region of the sample, and a corresponding map of the sample can be generated.

A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, $A_S$, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

AFMs may be designed to operate in a variety of modes, including contact mode and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e., the force resulting from tip/sample interaction.

Alternative feedback arrangements keep the phase or oscillation frequency constant. As in contact mode, these feedback signals are then collected, stored, and used as data to characterize the sample. Note that "SPM" and the acronyms for the specific types of SPMs, may be used herein to refer to either the microscope apparatus or the associated technique, e.g., "atomic force microscopy." In an improvement on the ubiquitous TappingMode™, called Peak Force Tapping® (PFT) Mode, discussed in U.S. Pat. Nos. 8,739,309, 9,322,842 and 9,588,136, which are expressly incorporated by reference herein, feedback is based on force (also known as a transient probe-sample interaction force) as measured in each oscillation cycle.

Regardless of their mode of operation, AFMs can obtain resolution down to the atomic level on a wide variety of insulating and conductive surfaces in air, liquid, or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

In this regard, AFMs may be employed in automated applications, including in high-precision manufacturing processes such as in semiconductor fabrication. Because AFMs can provide high resolution measurement of nanoscale surface features (e.g., topography), AFM has proven to be useful in the semiconductor space. However, classically, AFM data has been hindered by AFM system noise, including in the sensor systems, such as the optical beam-bounce arrangement described above, used to collect the metrology data.

Non-local means (NLM) (https://en.wikipedia.org/wiki/Non-local_means) and other denoising techniques such as Total variation (TV) (https://en.wikipedia.org/wiki/Total_variation_denoising) have been applied to AFM image data in an attempt to address this sensor noise. In these cases, manual image denoising is performed after image acquisition. The limitations of post-processing of image data include, additional time to ultimately display an image with minimized sensor noise, inability to tune scan parameters during data acquisition. Manual image post-processing makes it impossible to automate data acquisition and processing, what is required in a high-speed FAB (e.g., semiconductor fabrication) environment.

As a result, the AFM field, including automated AFM, was in need of a solution to address and compensate for system noise such as sensor noise. Improved data acquisition and display times were desired, preferably with minimal post-image acquisition processing. Such a system would allow AFMs to produce clean real-time images of a variety of sample surfaces with high resolution.

SUMMARY OF THE INVENTION

The preferred embodiments overcome the drawbacks of current AFM systems that denoise images using post-imaging processing by providing an AFM and corresponding method to denoise an AFM image as it is being acquired, in real time. Real time processing is the execution of data processing in a short time period during AFM image acquisition, providing near-instantaneous output. A baseline noise image is acquired automatically prior to AFM operation/image acquisition and then a specified number of lines are imaged and denoised using the initial noise measurement. Blocks of lines of the scan are selected (e.g., 5 lines) and denoised in real time to generate a "clean" version of at least one of the lines—the middle line. The middle lines from each of the series of line blocks form the final image. The denoising can be accomplished using any number of known algorithms, such as the NLM and TV algorithms described previously. These steps are repeated until the sample, or region of interest of the sample, is imaged. The method and system thereby produce an AFM sample image in which sensor/system noise is substantially removed, while preserving the metrology.

According to a preferred embodiment, a method of atomic force microscopy (AFM), the method includes engaging a probe of the AFM with a surface of a sample and oscillating the probe in a mode of AFM operation. Next, the method includes measuring system noise to generate a noise image. Then, relative scanning motion between the probe and sample is provided, and the deflection of the probe in response to the providing step is measured. The probe-sample separation is controlled according to the mode of AFM operation for a selected number of scan lines to generate a sample image for the selected number of scan lines. The method then includes denoising the sample image using the system noise. The deflection for the next line of the scanning motion is measured to generate a new sample image and the new sample image is denoised in real time using the system noise.

In a further aspect of this preferred embodiment, the selected number is at least two and more preferably, the selected number is at least five, and the denoised sample image is of the middle of the selected number.

In a still further aspect of this embodiment, the denoising step includes using a Non-local Means denoising algorithm, a Total Variation denoising algorithm, or another image denoising algorithm.

According to another aspect of this embodiment, the scanning motion is a raster scan, and the method includes repeating all the steps after and including the denoising step until a region of interest of the sample is imaged.

According to yet another aspect of this embodiment, the method optionally includes applying one of a low-pass kernel and a deconvolution kernel to the denoised image.

According to another preferred embodiment, an atomic force microscope (AFM) includes a scanner that provides relative scanning motion between a probe of the AFM and a sample, a detector that measures the deflection of the probe in response to probe-sample interaction during AFM operation, the deflection being indicative of a sample property and stored as an image, and a controller that implements a denoising algorithm to denoise the image of a selected number of scan lines in real time during AFM operation.

In another aspect of this embodiment, the selected number is at least two scan lines and more preferably, the selected number is at least five scan lines and the denoised image is the middle of the at least five scan lines.

According to a further aspect of this embodiment, the controller implements one of a low-pass Kernel and a deconvolution kernel to the denoised image to minimize an effect of an offset between a trace and re-trace AFM imaging operation.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 5A-5E are a series of AFM images using the real-time denoising methods of a preferred embodiment using total variation (TV) filtering, as well as a deconvolution or low-pass kernel to eliminate offset between trace-retrace lines.

DETAILED DESCRIPTION OF THE PREFERRED EMBODIMENTS

The preferred embodiments are directed to a denoising approach to Atomic Force Microscopy (AFM) which allows for real-time improvement of acquiring high resolution AFM data. The methods described herein employ known denoising techniques in a high speed data processing architecture to account for sensor noise always present during AFM sample imaging, while making sure to preserve the metrology.

Figure 1:
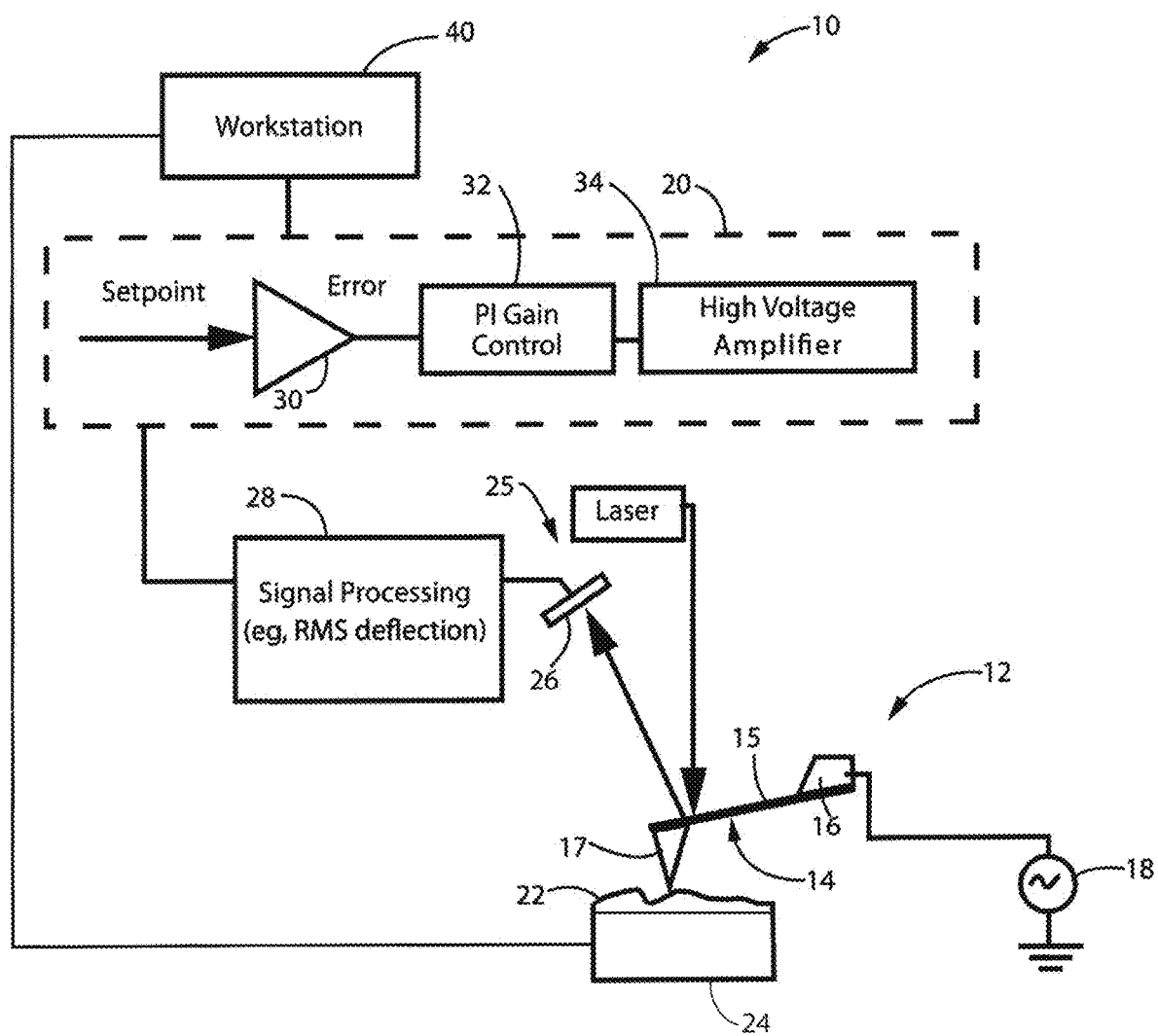
FIG. 1 is a schematic illustration of a Prior Art atomic force microscope AFM.
Figure 2:
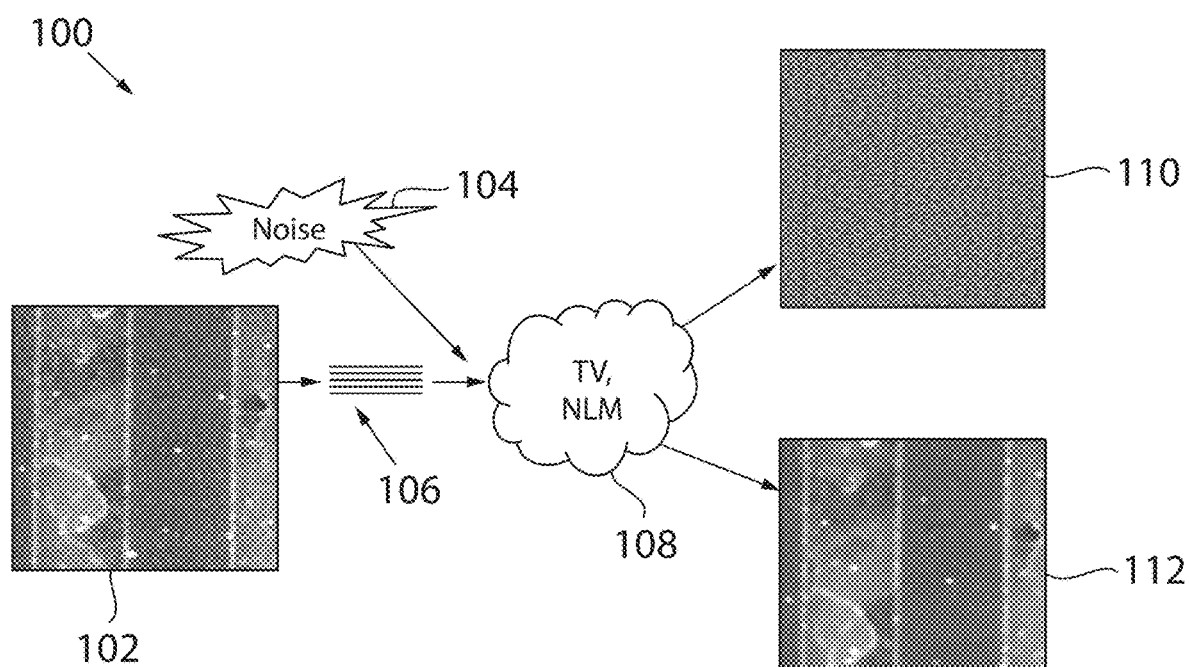
FIG. 2 is a simplified block diagram of the process of real-time denoising of AFM image data.

Turning initially to FIG. 2, a simplified illustration of a process 100 of a preferred embodiment is shown. Moving from left to right, a sample 102 with features of interest to be imaged is shown as step one. This is represented as a raw AFM image that includes anomalies such as sensor noise 104 that tend to compromise resolution. In step two, the probe is engaged with the sample and an AFM scan is initiated. A selected number of scan lines 106 corresponding to a moving block/buffer over a section of interest (e.g., 1000 nm×1000 nm scan area) are scanned, with the data being sent to a processing block to perform denoising of the image, in real time, using known algorithms. The image buffer can be as few as two (2) lines, with five (5) being preferred. Five (5) lines provides good denoising quality with sufficient line density while maintaining sufficient throughput for the user's imaging needs. Two such preferred algorithms 108 include Total Variation (TV) filtering and Non-local Means (NLM). Non-local means denoising works best when scanning surfaces containing self-similarities such as periodic or textured backgrounds, rough surfaces, etc. Total variation denoising works best when scanning surfaces containing flat regions with abrupt changes in height. Total variation denoising is capable of handling lower signal-to-noise ratios, but it can result in so-called staircase artifacts.

The amplitude and spectral content of AFM sensor noise is measured in the center of the scan area of interest and then used with every image block/buffer and with the corresponding denoising algorithm. This noise can be periodic, random, or a combination of the two. A noise profile removed from the raw image is illustrated in the image 110 shown in FIG. 2. Post denoising, the middle of the rolling buffer of five lines is then added to the displayed image as the entire sample section is scanned to produce the AFM image 112 having preserved metrology with the measured amount of sensor noise removed. Denoising parameters (regularization parameter lambda for TV and filtering parameter h for NLM) are selected to start, and are tuned automatically for every, in this case, 5-line data block by matching the measured noise amplitude to the amplitude of the difference between the image block before and after denoising. In this way, the amount of noise removed from the AFM image 102 is equal to the amount of measured sensor noise. A sample image 112, in comparison to the raw AFM image data 102, is more "clean" making identification of features of interest with higher resolution more possible.

As part of the automatic tuning, the image buffer can be rescaled to remove outliers before total variation or non-local means processing. The outliers are defined as data points deviating from the mean value by more than a specified number of standard deviations (sigma). After the denoising process, the outliers are restored. 6-sigma is the preferred accuracy threshold. However, thresholds of 1-sigma or more can be used.

Optionally, a deconvolution kernel (filtering by weighted averaging of adjacent pixels to the pixel in question, illustrating how the pixel's filtered value depends on its neighbors) of a selected size, for example, 3×1, can be used with the total variation algorithm, while a low-pass kernel of size 3×1 can be used with the non-local means algorithm, in order to effectively eliminate apparent trace-retrace offsets. The trace-retrace offsets are caused by high scan speed and scan artifacts like parachuting. However, larger kernels can be used as well.

Sensor noise amplitude scaled by a factor of ⅔ is a good target for total variation denoising residual RMS error. However, other scaling factors less or more than one (1) can be effectively used.

With respect to NLM denoising, a research window of size 5×5 provides useful results in the AFM space. However, other NLM research window sizes can be used, depending on the image resolution.

Figure 3:
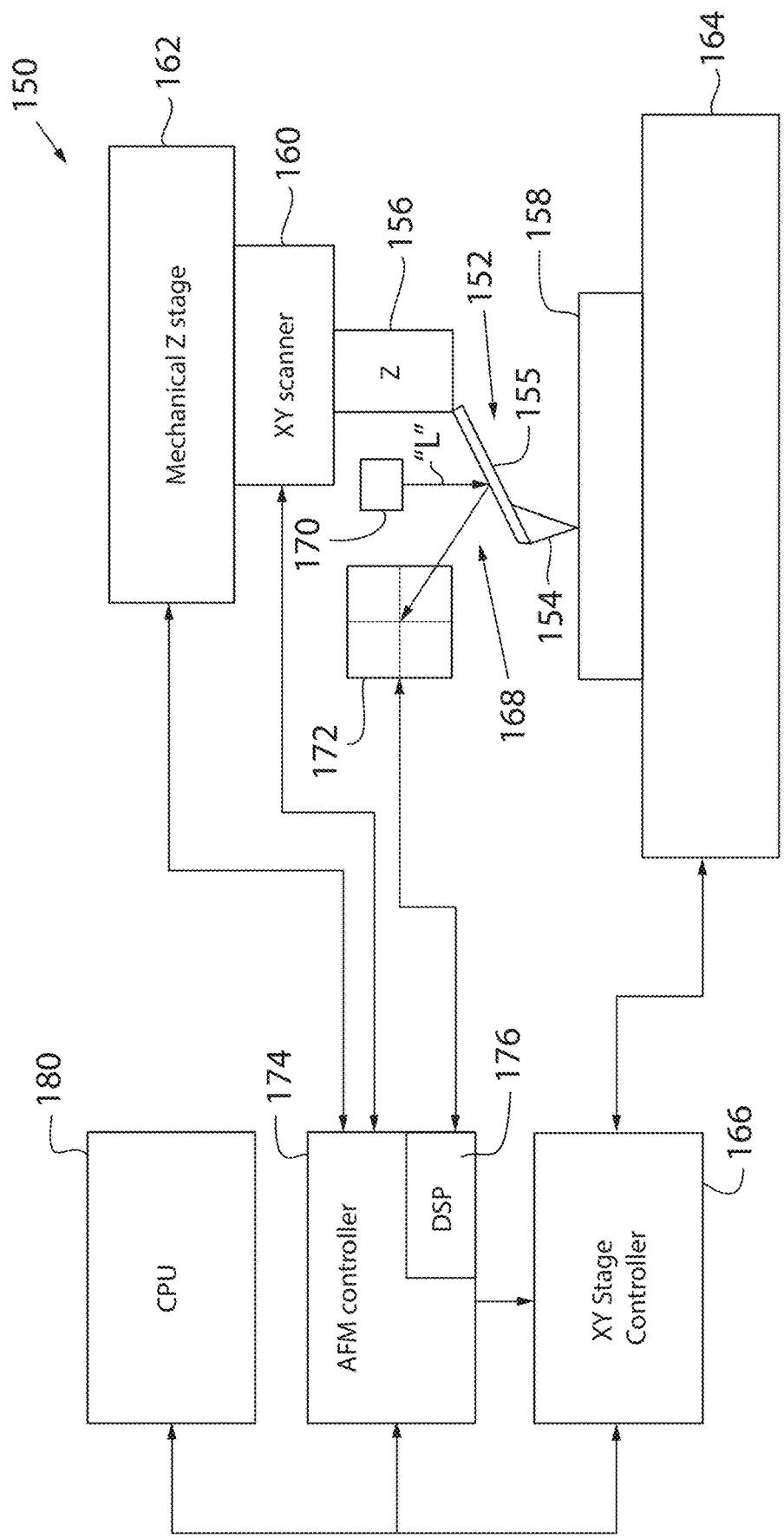
FIG. 3 is a block diagram of an AFM system for acquiring AFM data and performing real-time denoising of the same.

A scanning probe microscope instrument 150 (e.g., AFM) according to a preferred embodiment is shown in FIG. 3. In this embodiment, a probe 152, having a tip 154 is held by a probe holder (not shown) supported by piezoelectric tube scanner 156. Scanner 156 is a "Z" or vertical scanner responsive to sample properties in the closed loop control system to position the tip 154 relative to a sample 158 during AFM imaging. Tube scanner 156 is coupled to an XY scanner 160, preferably also a piezoelectric tube, that is used to raster the probe tip 162 relative to the sample surface during AFM operation. A mechanical Z-stage 162 is employed for providing large movement in Z between tip 154 and sample 158, for example, during AFM image acquisition start-up to engage tip 154 and sample 158. Sample 158 is mounted on an XY stage 164 that primarily provides coarse XY motion to position probe 152 at a region of interest of sample 158. An XY stage controller 166 controls stage 164 to locate the probe/sample at that region of interest. However, stage 164 may be configured to provide relative scanning motion (e.g., raster) between tip 154 and sample 158 at a selected scan speed. Controller 166 is also responsive to AFM controller 176 to position the image scan at a region of interest. Controllers 166, 174 are implemented by a computer 180.

In operation, after tip 154 is engaged with sample 158, a high speed scan of the sample is initiated with XY scanner 160 in a mode AFM mode of operation (e.g., PFT mode), as discussed previously. As tip 154 interacts with the surface of sample 158, the probe 152 deflects and this deflection is measured by an optical beam-bounce deflection detection apparatus 168. Apparatus 168 includes a laser 170 that directs a beam "L" off the backside of cantilever 155 and toward a photodetector 172 which transmits the deflection signal to, for example, a DSP 176 of AFM controller 174 for high speed processing of the deflection signal.

AFM controller 174 continuously determines a control signal according to the AFM operating mode, and transmits that signal to the piezo tube 156 to maintain the Z position of probe 152 relative to sample 158, and more specifically, to maintain deflection of the probe at the feedback setpoint. Controller 174 also implements the real-time processing of the sensor noise with the TV or NLM algorithms. This AFM control is further illustrated in FIG. 4.

Figure 4:
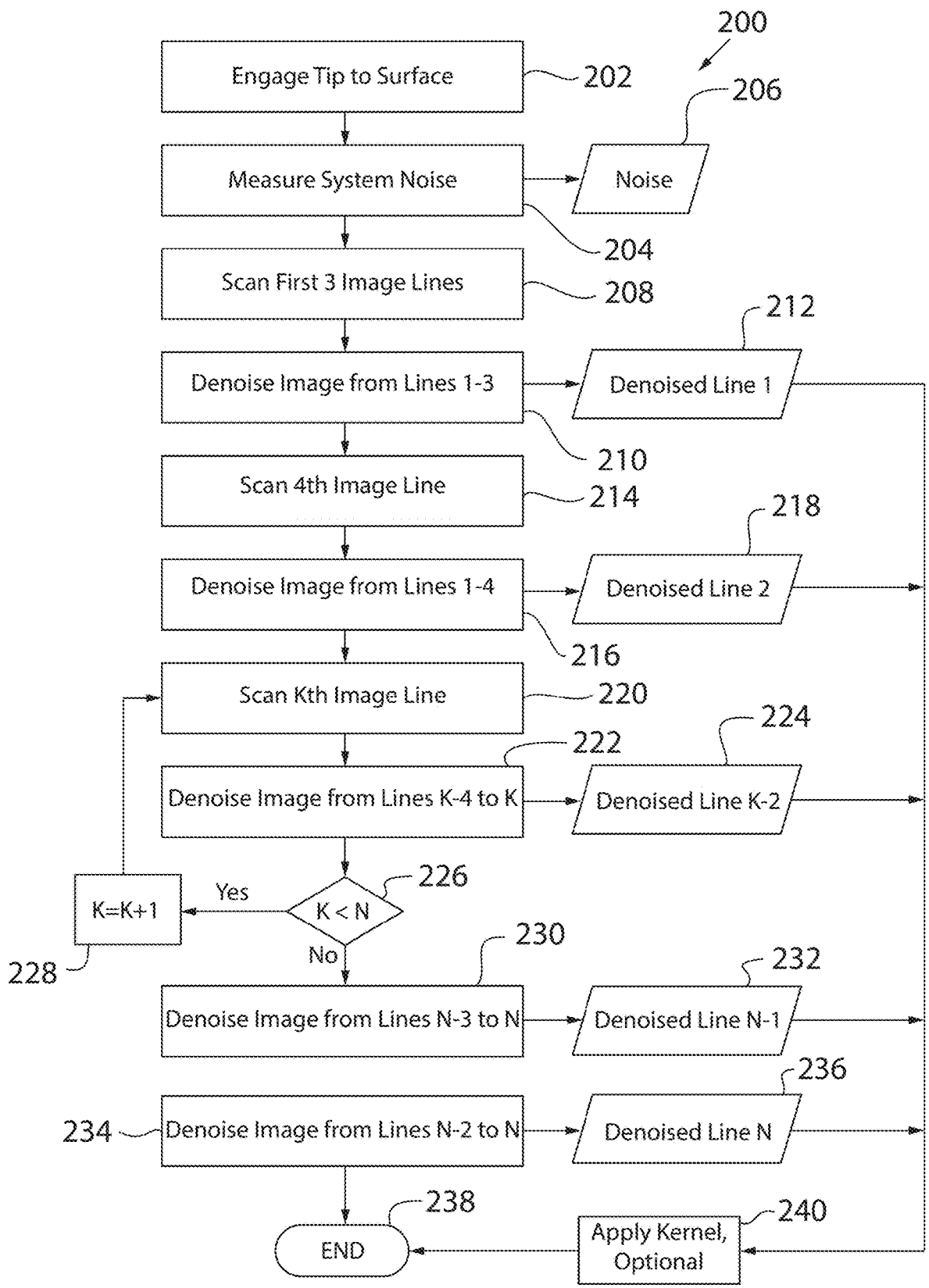
FIG. 4 is a flow chart illustrating a real time denoising method of a preferred embodiment, using either non-local means or total variation filtering.

Turning to FIG. 4, a method 200 of real-time denoising of AFM image data is shown. In Block 202, the AFM tip is engaged with the sample surface. A start-up measure of raw system noise (i.e., sensor noise) is performed in Block 204 and saved as output noise 206. For the noise measurement scan, scan area is very small (e.g. 1 nm×1 nm) and the number of scan lines is small (e.g., 10). This noise is typically coherent and stable over time, making this measurement useful for denoising the AFM images ultimately acquired. Then, in Block 208 the AFM scans, for example, the first three (3) lines of the sample region of interest and collects the AFM metrology data. Method 100 de-noises (e.g., using TV or NLM denoising algorithms) in Block 210, and a denoised "line 1" 212 of the AFM scan is captured and displayed as part of the final image.

Next, the AFM raster scan continues in Block 214 to image the fourth line of the sample region. In Block 216, the AFM image data sent to the DSP is processed using the selected denoising algorithm to denoise the image from Lines 1-4. This operation yields a denoised Line 2 (218) of the scan. In the case in which the image block/buffer is selected to be five (5) lines, which is preferred (block/buffer size can be as few as two lines and more than five lines), method 100 proceeds to Block 220 to scan the Kth (e.g., $5^{th}$) line of the AFM data acquisition scan. In Block 222, the AFM data/image is denoised from Lines K−4 to K. In the preferred embodiment, the denoised K−2 Line (the middle line of the five lines) is captured and output 224 for display. This denoised data is added to the displayed image, corrected for the sensor noise. More particularly, denoising parameters are tuned automatically for every 5-line data block by matching the measured noise amplitude (Block 206) to the amplitude of the difference between the image block before and after denoising. As a result, the amount of noise removed from the AFM image is substantially equal to the amount of measured sensor noise.

Method 100 then asks whether all lines (N, the number of lines to image) in the section of the sample (i.e., region of interest) to be imaged have been scanned in Block 226 and, if not (K<N), the variable K is incremented by one in Block 228 and that line is scanned by the AFM, returning control to Block 220. The data is denoised as described previously and a new denoised middle line of the image is output (224). If on the other hand, the scan is nearing its end (K=N), method 100 de-noises the image data from Lines N−3 to N in Block 230, yielding a denoised Line N−1 (232). To obtain a denoised Line N, method 200 de-noises the AFM image data from lines N−2 to N using a selected algorithm (again, TV or NLM). With denoised Line N (236) a denoised sample image is produced while preserving the metrology (surface roughness, depth on both sides of sample features—lines/ trenches in the semi space, for example, etc.), ending method 200 at Block 238. Optionally, a deconvolution (TV denoising) or a low-pass (NLM denoising) kernel 240 (e.g., 3×1) maybe also be employed to effectively eliminate trace-retrace offsets (a common AFM imaging anomaly). Corresponding exemplary images are shown in FIGS. 5 and 6, described further below.

Turning to FIGS. 5A-5E, a series of images generated according to the above-described method utilizing Total Variation (TV) denoising are shown. NIQE is Naturalness Image Quality Evaluator (no-reference image quality score). Smaller values correspond to a better-quality image. The AFM images are 512×512 pixels with a 10 μm×10 μm region of interest. FIG. 5A is an AFM image collected without denoising. Artifacts, which may appear as some "ghosting" due to system sensor noise, can compromise the identification of surface features, leading to an image having less than optimal resolution. With TV denoising, FIG. 5B illustrates a smoother, cleaner image with improved surface feature resolution due to real-time denoising of the sensor noise as described previously. The sensor noise is shown in FIG. 5C.

In FIG. 5D, the optional deconvolution kernel is employed to eliminate the trace-retrace data offset between the data collected in the trace direction (e.g. left-to-right) and retrace direction (e.g. right-to-left). The kernel operates to adjust the AFM data on a pixel-pixel basis. For example, 3×1 kernel with weights of 0.25, 0.5, 0.25 added to the TV optimization, will effectively average any trace-retrace offsets between the current scan line and the lines before and after the current one. FIG. 5D is the resultant image with real-time denoising with the kernel, while FIG. 5E shows the residual sensor noise and the trace-retrace errors removed.

Figure 6A:
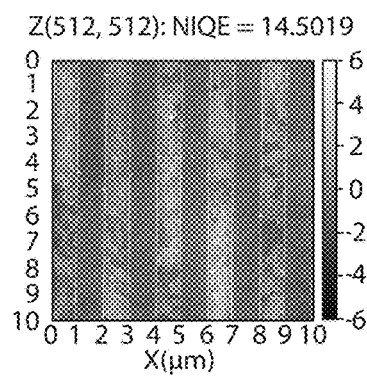
FIGS. 6A-6E are a series of AFM images using the real-time denoising methods of a preferred embodiment using non-local means (NLM), as well as a deconvolution or low-pass kernel to eliminate offset between trace-re-trace lines.
Figure 6B:
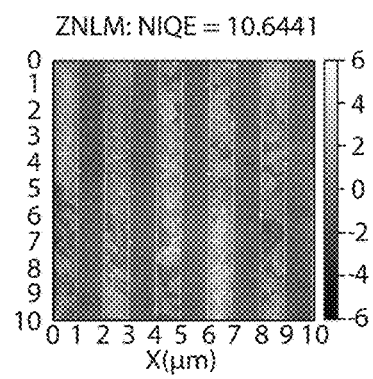
Figure 6C:
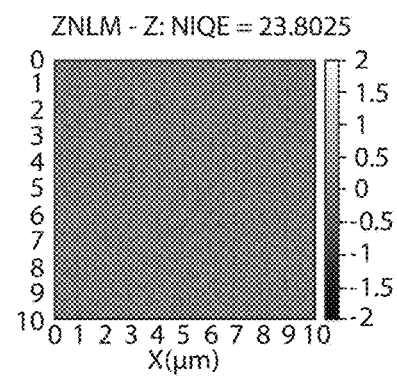

FIG. 6A is an AFM image acquired without denoising. Similar to FIG. 5A, the image includes artifacts due to system sensor noise, therefore giving the surface features of the image less than optimal resolution. In this case, NLM denoising is employed. FIG. 6B illustrates improved resolution of surface features due to real-time NLM denoising of the sensor noise. The sensor noise is shown in FIG. 6C.

Figure 6D:
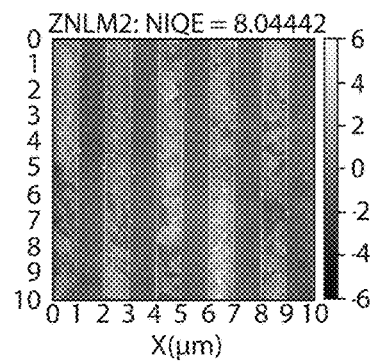
Figure 6E:
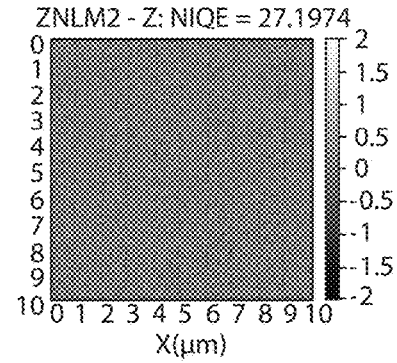

In FIG. 6D, the optional low-pass kernel is employed to eliminate the trace-retrace data offset between the data collected in the trace direction (e.g. left-to-right) and retrace direction (e.g. right-to-left). The kernel operates to adjust the AFM data on a pixel-pixel basis. For example, 3×1 kernel with weights of 0.25, 0.5, 0.25 added after NLM processing, will effectively average any trace-retrace offsets between the current scan line and the lines before and after the current one. FIG. 6D is the resultant image with real-time denoising with the kernel, while FIG. 6E shows the residual sensor noise and the trace-retrace errors removed.

In addition to TV and NLM, several other denoising techniques can be applied to process each image block/ buffer without affecting the metrology of the final image. Such denoising techniques include median filter, Fourier domain denoising, Wavelet domain denoising, etc.

The preferred embodiments are directed to a method and apparatus that provide high resolution AFM images substantially free of sensor noise without the need for post-processing of the image. The denoising techniques are fully automated, being performed in real time while the image is being acquired—no noise is visible as the image is being acquired. AFM sensor noise is suppressed and no additional image distortion is introduced.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:
1. A method of atomic force microscopy (AFM), the method comprising:
engaging a probe of the AFM with a surface of a sample;
oscillating the probe in a mode of AFM operation;
measuring system noise to generate a noise image;
providing relative scanning motion between the probe and sample;
measuring the deflection of the probe in response to the providing step and controlling the probe-sample separation according to the mode of AFM operation for a selected number of scan lines to generate a sample image for the selected number of scan lines;

denoising the sample image in real time using the system noise;

measuring the deflection for the next line of the scanning motion to generate a new sample image; and denoising the new sample image in real time using the system noise.

2. The method of claim 1, wherein the selected number is at least two.

3. The method of claim 2, wherein the selected number is at least five, and the denoised sample image line is of the middle of the selected number.

4. The method of claim 3, wherein the denoising step includes using a Non-local Means (NLM) denoising algorithm.

5. The method of claim 1, wherein the denoising step includes using a Total Variation (TV) denoising algorithm.

6. The method of claim 1, wherein the scanning motion is a raster scan.

7. The method of claim 1, further comprising repeating all the steps after and including the denoising step until a region of interest of the sample is imaged.

8. The method of claim 1, wherein the mode is one of peak force tapping (PFT) mode, contact mode and tapping mode.

9. The method of claim 1, further comprising applying one of a low-pass kernel and a deconvolution kernel to the denoised image.

10. An atomic force microscope (AFM) comprising:

a scanner that provides relative scanning motion between a probe of the AFM and a sample;

a detector that measures the deflection of the probe in response to probe-sample interaction during AFM operation, the deflection being indicative of a sample property and stored as an image; and a controller that implements a denoising algorithm to denoise the image of a selected number of scan lines in real time during AFM operation.

11. The AFM of claim 10, wherein the selected number is at least two scan lines.

12. The AFM of claim 11, wherein the selected number is at least five scan lines and the denoised image is the middle of the at least five scan lines.

13. The AFM of claim 10, wherein the denoising algorithm is one of Total Variation (TV) denoising, and Non-local Means (NLM) denoising.

14. The AFM of claim 10, wherein the controller implements one of a low-pass Kernel and a deconvolution kernel to the denoised image to minimize an affect of an offset between a trace and re-trace AFM imaging operation.

15. The method of claim 12, wherein the AFM is operated in one of peak force tapping (PFT) mode, contact mode and tapping mode.

* * * * *